United States Patent [19]

Fujioka et al.

[11] Patent Number: 5,471,277
[45] Date of Patent: Nov. 28, 1995

[54] BOOK DOCUMENT READING DEVICE HAVING A PAGE TURNING CAPABILITY

[75] Inventors: Tetsuya Fujioka, Yokohama; Kazunori Bannai, Tokyo; Hiroshi Takahashi, Kawasaki, all of Japan

[73] Assignee: Ricoh Company, Ltd., Tokyo, Japan

[21] Appl. No.: 223,026

[22] Filed: Apr. 5, 1994

[30] Foreign Application Priority Data

Apr. 5, 1993 [JP] Japan ................................. 5-078198

[51] Int. Cl.$^6$ ............................ G03B 27/32; H04N 1/04; B65H 29/30
[52] U.S. Cl. .................... 355/25; 84/487; 84/497; 40/531
[58] Field of Search ............................ 355/25; 84/487, 84/497; 40/531, 532

[56] References Cited

U.S. PATENT DOCUMENTS

| | | | |
|---|---|---|---|
| 4,102,071 | 7/1978 | D'Arcy | 40/531 |
| 4,488,367 | 12/1984 | Yamauchi et al. | 40/531 |
| 4,516,866 | 5/1985 | Yamanorichi et al. | 400/25 |
| 4,644,675 | 2/1987 | Berger et al. | 40/531 |
| 4,663,873 | 5/1987 | Shinbrot | 40/531 |
| 4,673,286 | 6/1987 | Shinbrot | 355/25 |
| 4,916,839 | 4/1990 | Nakanishi | 40/475 |
| 4,942,482 | 7/1990 | Kakinuma et al. | 358/474 |
| 4,995,184 | 2/1991 | Ebata et al. | 40/531 |
| 5,177,617 | 1/1993 | Tuhro | 358/296 |
| 5,325,213 | 6/1994 | Takahashi et al. | 358/474 |

Primary Examiner—Michael L. Gellner
Assistant Examiner—D. P. Malley
Attorney, Agent, or Firm—Oblon, Spivak, McClelland, Maier & Neustadt

[57] ABSTRACT

In a book document reading device having a page turning capability, a turn belt has a flat portion at the underside thereof and is supported by a turn roller. The turn roller selectively moves the turn belt to a first position where the flat portion of the belt electrostatically attracts the uppermost leaf of a book document, which is spread on a table, in contact with the leaf, or to a second position where the belt is spaced apart from the book document while carrying the uppermost page therewith. When the turn belt is moved from the first position to the second position, a scanning unit is caused to stop moving. This allows the leaf of the document to surely adhere to the turn belt.

24 Claims, 20 Drawing Sheets

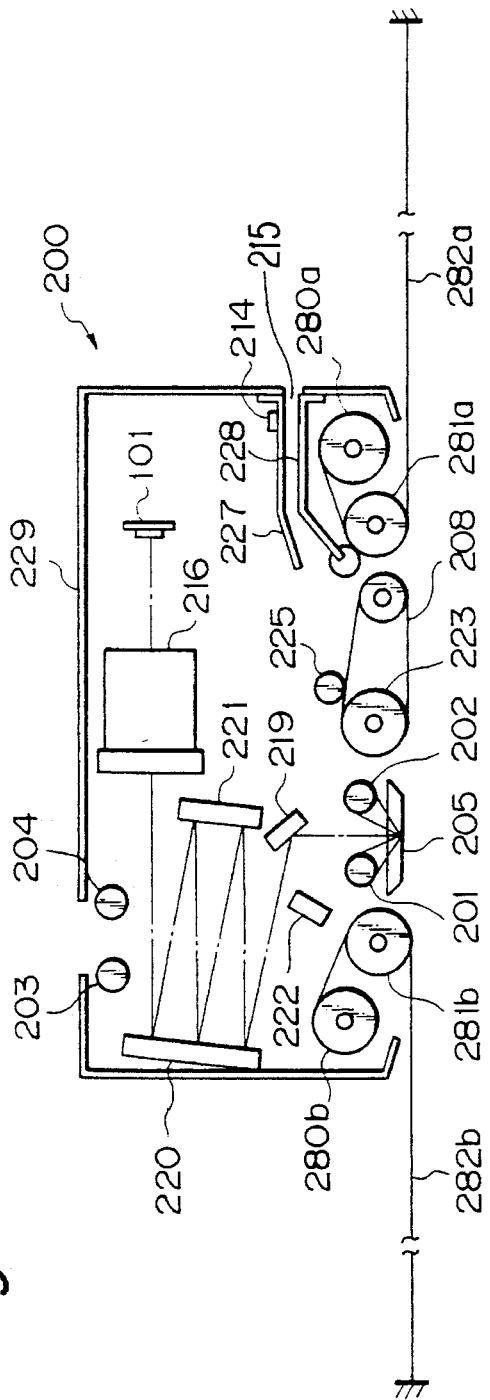

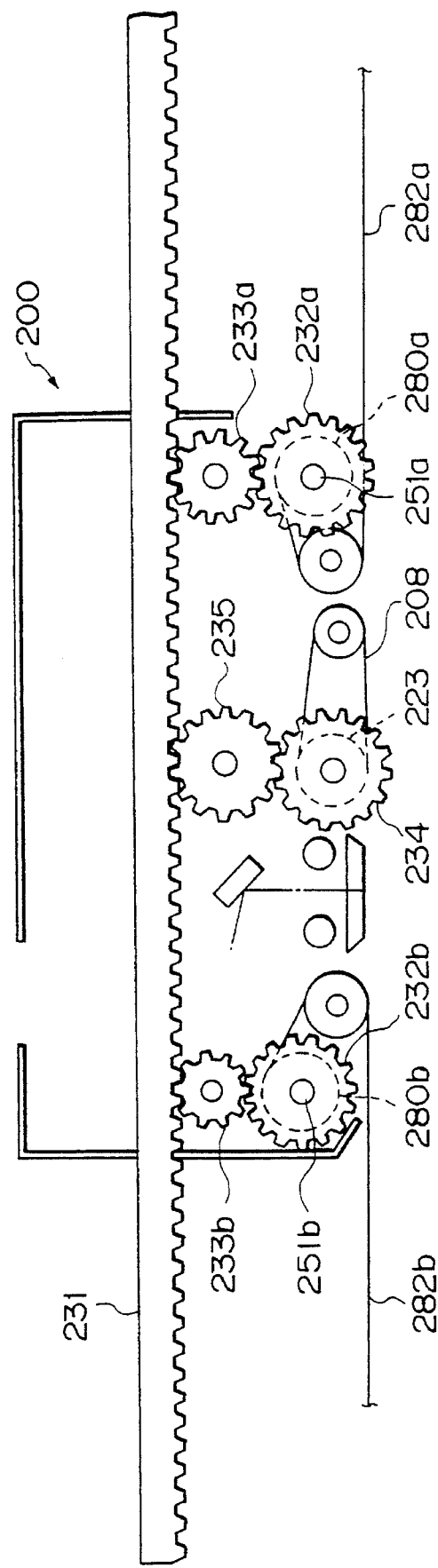

BOOK DOCUMENT READING DEVICE HAVING A PAGE TURNING CAPABILITY

BACKGROUND OF THE INVENTION

The present invention relates to an image reading device installed in a copier, facsimile apparatus or similar image forming apparatus and, more particularly, to a device for reading the images of a book document and having a page turning capability.

An automatic document feeder (ADF) is extensively used with an image forming apparatus of the kind described as an image reading device. The ADF automatically transports a sheet document to a reading position, reads the image of the document, and then discharges the document from the reading device. So far as the document is a sheet document, the ADF can read it automatically. However, regarding a book document, it is extremely difficult to automate the page turning operation of the ADF. The only measure left at the present stage of development is to turn the pages of a book manually. Although various methods and means have, of course, been proposed for reading a book document automatically, most of them are merely conceptual and far from practicality.

In the light of this, Japanese Patent Laid-Open Publication (Kokai) No. 2-193589 discloses a device capable of reading a book document while turning the pages thereof with a page turning and reading unit, or scanning unit as referred to hereinafter. The scanning unit has thereinside page receiving means, page attracting means, page separating means, reading means, etc. Specifically, the scanning unit has a page turning belt extending along the surface of a document table. While a document is laid on the document table in a spread position between the surface of the table and the belt, the scanning unit is moved relative to the document while causing the belt to form a roundabout portion moving away from the table. With this kind of device, it is possible to fully automate the page turning and image reading operation which has heretofore been time- and labor consuming and, therefore, to implement a multifunction image reading system remarkably enhancing the productivity of, for example, a copier.

Assume that in the conventional device the page turning means for turning the pages of a book document in contact with the spread surface thereof is constituted by a dielectric belt, and means for generating an electric field on the belt. Then, the prerequisite is that the belt be capable of surely causing the page of the document to adhere thereto. Another prerequisite is that only the top leaf of the book adheres to the belt.

Further, assume that the dielectric belt, constituting the page turning means in combination with the electric field generating means, is movable upward while carrying the top page of the document therewith, thereby separating the top page from the underlying pages. In this case, it is necessary to stabilize the movement of the scanning unit and prevent the leaves of the book from being torn or bent in the event of page turning. Particularly, the top page fully turned by the belt should be smoothly released.

Moreover, with the page turning means constituted by the dielectric belt and electric field generating means, it is necessary that a high voltage harness for feeding a high voltage to the electric field generating means be wired safely, and the wasteful application of a high voltage to the belt be minimized which would cause the belt to deteriorate due to fatigue.

SUMMARY OF THE INVENTION

It is, therefore, an object of the present invention to provide a book document reading device having a page turning capability and allowing a dielectric belt thereof to surely attract the page of a book document.

It is another object of the present invention to provide a book document reading device which allows a dielectric belt thereof to surely attract only the top page of a book document.

It is another object of the present invention to provide a book document reading device which stabilizes the movement of a scanning unit and prevents a book document from being torn or bent when turning the pages thereof.

It is another object of the present invention to provide a book document reading device capable of releasing the top page of a book document smoothly after turning it.

It is another object of the present invention to provide a book document reading device having a page turning capability and allowing a high voltage harness for applying a high voltage to electric field generating means thereof to be wired safely.

It is another object of the present invention to provide a book document reading device having a page turning capability and capable of minimizing the deterioration of a dielectric belt thereof due to fatigue which would otherwise be caused by the wasteful application of a high voltage to the belt.

A device for reading a book document of the present invention comprises a document table for setting the book document in a spread position face up, a page turning device for turning the page of the book document by scanning the surface of the book document, and a scanning unit supporting the page turning device for allowing the page turning device to scan the book document. The page turning device comprises a belt made of a dielectric material, a support over which said belt is passed such that the belt has a flat portion at the underside thereof, a drive mechanism for rotating the belt in a direction in which the scanning unit moves, an electric field generating device for generating an electric field on the belt for electrostatically attracting the uppermost leaf of the book document and separating the uppermost leaf from the other leaves, and a moving mechanism for moving the support between a first position where the flat portion of the belt contacts the uppermost leaf of the book document for attracting it, and a second position where the flat portion is spaced apart from the book document while carrying the uppermost leaf therewith to thereby separate it from the other leaves.

BRIEF DESCRIPTION OF THE DRAWINGS

The above and other objects, features and advantages of the present invention will become more apparent from the following detailed description taken with the accompanying drawings in which:

FIG. 3 is a section of the scanning unit;

FIG. 4 is a section showing the structure of a take-up roller included in the scanning unit;

FIG. 5 is a side elevation of a mechanism for driving take-up rollers and turn rollers included in the scanning unit;

DESCRIPTION OF THE PREFERRED EMBODIMENT

A preferred embodiment of the book document reading device in accordance with the present invention will be described hereinafter. While the present invention allows an image reading function and a page turning function implemented independently of each other, the illustrative embodiment will be described as incorporating the two functions in a single unit by way of example.

Figure 1:
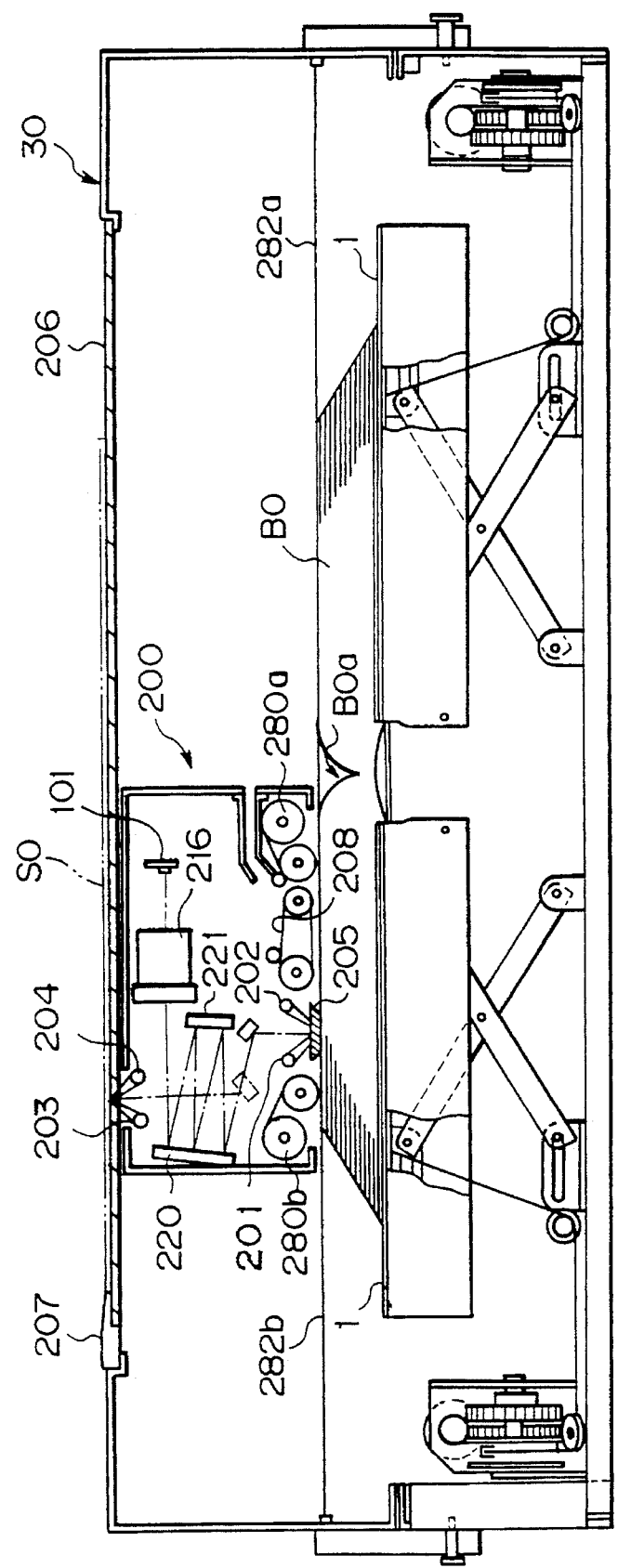
FIG. 1 is a section showing a book document reading device embodying the present invention.

Referring to FIG. 1 of the drawings, a book document reading device with a page turning capability embodying the present invention is shown. As shown, the device, or TPS (Turn the Page Scanner), has a glass platen 206 and a scale 207 on the top thereof. When a sheet document or a thick book document is set on the glass platen 206 by a cover plate, not shown, a scanning unit 200 is capable of reading the document by scanning it after the optical path thereof has been switched over, as will be described later. The upper half of the TPS is constituted by a scanner unit 30. The scanning unit 200 is movable in the right-and-left direction, as viewed in FIG. 1, within the scanner unit 30.

Figure 2:
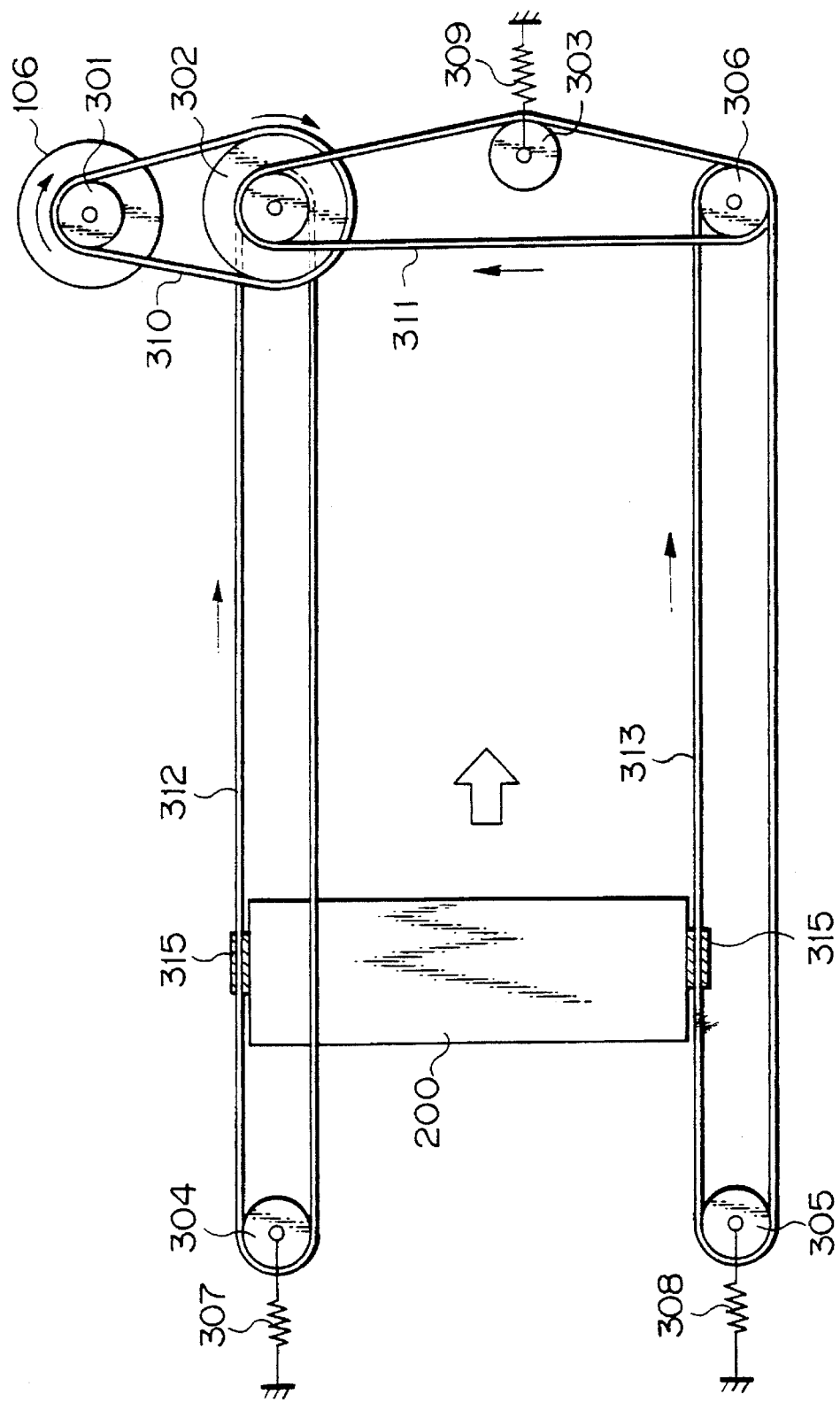
FIG. 2 is a plan view of a mechanism for driving the scanning unit included in the embodiment.

FIG. 2 shows a system for driving the scanning unit 200 in a view as seen from above the TPS. As shown, a timing belt 312 is passed over pulleys 304 and 302 and extends in the right-and-left direction at the rear side of the TPS. Another timing belt 313 is passed over a pulley 305 and a stepped pulley 306 and extends in the right-and-left direction at the front side of the TPS. Springs 307 and 308 respectively support the shafts of the pulleys 304 and 305, thereby exerting a predetermined tension on the timing belts 312 and 313. A three-step pulley 302 is connected to a motor pulley 301 by the timing belt 310 and to the two-step pulley 306 by a timing belt 311. An idler 303 is constantly biased outward by a spring 309 so as to exert a predetermined tension on the timing belt 311. The scanning unit 200 have the front and rear sides thereof affixed to the timing belts 312 and 313 by clamps 315, respectively. When the scanner motor 106 is energized, the motor pulley 301 is rotated with the result that the scanning unit 200 is driven via the timing belts 312 and 313.

FIG. 3 shows the construction of the scanning unit 200. As shown, right and left press rollers 281a and 281b are rotatably mounted on the underside of the scanning unit 200. A right and a left take-up roller 280a and 280b, respectively, are also rotatably mounted on the underside of the scanning unit 200 outboard of the press rollers 281a and 281b, respectively. Right and left press sheets 282a and 282b, which are separate from each other, have their inner ends wrapped around the take-up rollers 280a and 280b, respectively. The outer ends of the sheets 282a and 282b are respectively affixed to the side walls of the scanner unit 30. The sheets 282a and 282b are each implemented by a fabric of Tetron yarns; a rubber-based resin is melted into opposite surfaces of the fabric. Undulations or marks of yarns appearing on the surfaces of the fabric prevent electrostatic adhesion due to charges from easily acting on the fabric.

FIG. 4 shows one of the identical take-up rollers 280a and 280b specifically. As shown, the take-up roller 280a has a shaft 251a, a hollow cylinder 280a surrounding the shaft 251a, and a spiral spring 252a anchored to the shaft 251a and cylinder 280a at opposite ends thereof. When the shaft 251a is further rotated from a position which stretches the associated press sheet 282a, a certain degree of tension can be exerted on the sheet 282a by the action of the spiral spring 252a. The other take-up roller 280b also has a shaft 251b, a hollow cylinder 280b, and a spiral spring 252b.

As shown in FIG. 5, take-up gears 232a and 232b are respectively mounted on the outer ends of the shafts 251a and 251b. A drive rack 231 is affixed to opposite side walls of the scanner unit 30 and formed with teeth over substantially the entire length thereof. The take-up gears 232a and 232b are held in mesh with the rack 231 via idle gears 233a and 233b, respectively. In this configuration, when the scanning unit 200 is moved, the take-up gears 232a and 232b rotate together with the associated idle gears 233a and 233b. As a result, the press sheets 282a and 282 are paid out or taken up via the shafts 251a and 251b, spiral springs 252a and 252b, and hollow cylinders 280a and 280b, respectively. Therefore, the tensions of the right and left take-up rollers 280a and 280b are substantially maintained constant. At this instant, the outermost periphery of the sheet 282a wrapping around the roller 280a and that of the sheet 282b wrapping around the roller 280b, as measured in the radial direction, differ from each other depending on the position of the scanning unit 200, since the sheets 282a and 282b each has a certain thickness. However, this difference is successfully absorbed by the spiral springs 252a and 252b.

Referring again to FIG. 3, a glass platen 205 for reading a book document BO and a turn belt 208 for turning the pages of the book document BO are located between the press rollers 281a and 281b. In the illustrative embodiment, the glass platen 205 and the turn belt 208 are respectively positioned at the upstream side and the downstream side in the direction in which the scanning unit 200 reads the book BO. This increases the distance available for the approach run of the scanning unit 200 and, therefore, stabilizes the scanning of the unit 200. In addition, the embodiment locates a page turning mechanism in the lower portion of the scanning unit 200 and reducing optics in the upper portion of the same unit 200, thereby reducing the overall size of the PTS.

Figure 6:
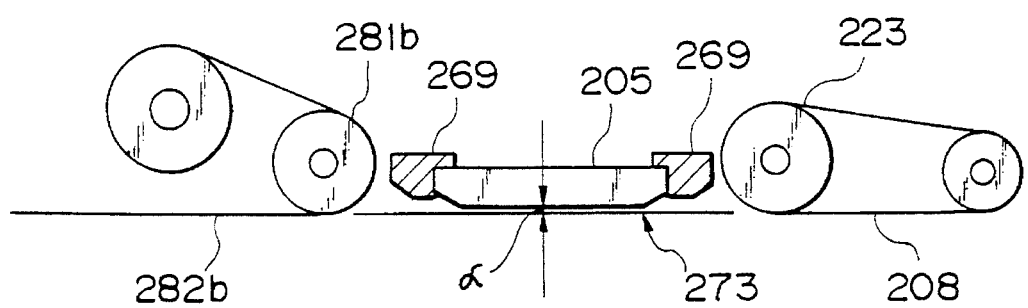
FIG. 6 is a section showing a positional relation between press rollers and a glass platen positioned at the reading section of the scanning unit.

Moreover, the scanning unit 200 can read the surface of the book BO (reading surface 273) which is pressed by the left press roller 281 b and a belt drive roller 223 and positioned between them. This insures an optimal image. As shown in FIG. 6, to accommodate some rise of the book surface, the lower surface of the glass platen 205 is disposed slightly above a horizontal plane (reading surface 273) in which the lowermost point of the left press roller 281b and that of the belt drive roller 223 lie; that is, a gap $\alpha$ is defined therebetween. The gap $\alpha$ is selected such that $2\alpha$ is smaller than the depth of a focus of the optics, and it is determined in conformity to the reduction ratio of the optics.

Figure 7:
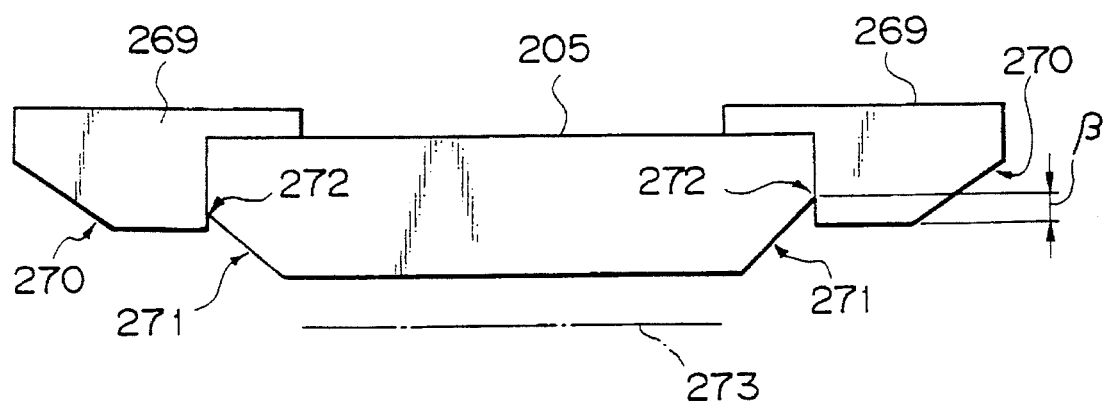
FIG. 7 is a section showing a positional relation between the glass platen and glass holders holding it.

As shown in FIG. 7, the glass platen 205 is supported by glass holders 269 at opposite sides thereof. The glass platen 205 has chamfers 271 at opposite ends of the underside while the glass holders 269 each has a chamfer 270 at the outer end of the underside. The upper corner 272 of each chamfer 271 is higher than the underside of the glass holders 269 by a small distance 13, so that the ends of the glass platen 205 may not catch the edges of pages.

As shown in FIG. 3, fluorescent lamps 201 and 202 are disposed above the glass platen 205 and at the right and left sides of the reading section. As the lamps 201 and 202 illuminate the book BO, the resulting imagewise reflection is reflected by a first mirror 219, reflected by a second mirror 220 and a third mirror 221 alternately, and then routed through a lens 216 to a CCD (Charge Coupled Device) image sensor 101 to form a reduced image.

The turn belt 208 is passed over the previously mentioned belt drive roller 223 and a roller 224. A charge roller 225 is held in contact with the upper run of the turn belt 208 at a position slightly spaced apart from the belt drive roller 224.

As shown in FIG. 5, a drive gear 234 is mounted on the shaft of the belt drive roller 223 and operatively connected to a drive rack 232 by an idle gear 235. When the scanning unit 200 is moved, the drive gear 234 rotates along the drive rack 232 together with the idle gear 235. Consequently, the drive roller 223 is rotated to cause the turn belt 208 to rotate at the same speed as the scanning unit 200.

Figure 8:
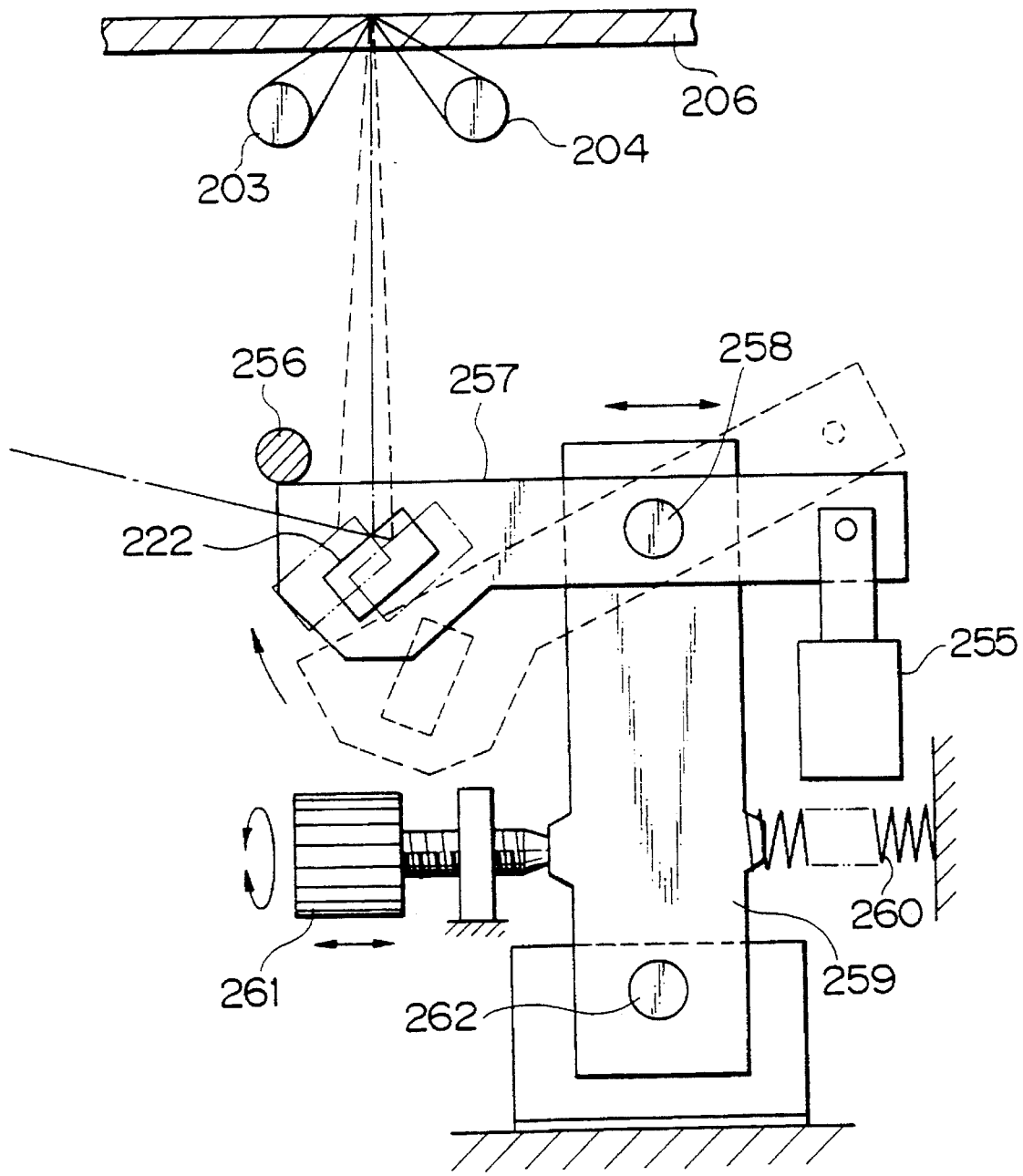
FIG. 8 is a side elevation showing means disposed in the scanning unit for driving a switch mirror and means for adjusting an optical path.
Figure 9:
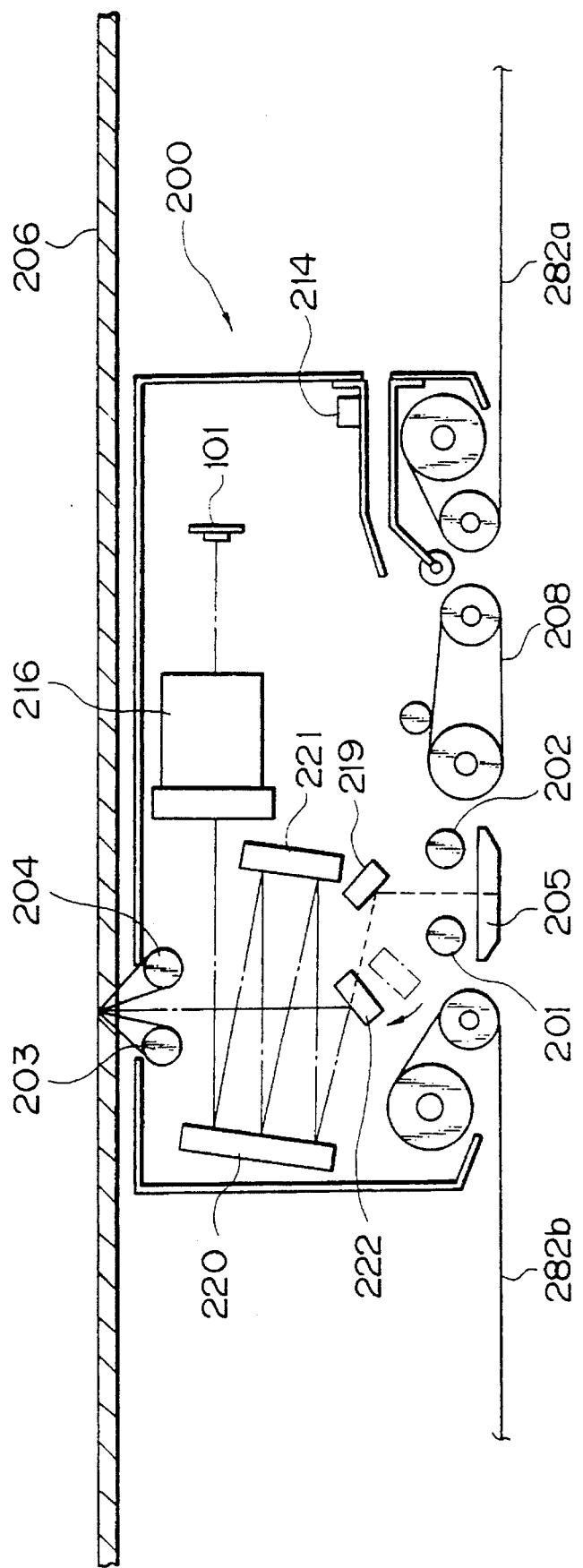
FIG. 9 is a section showing the scanning unit in a particular condition set up by the means shown in FIG. 67.

As shown in FIG. 3, a switch mirror 222 is usually held in a position retracted from the optical path of the scanning unit 200. When the scanning unit 200 is to read a document laid on the glass platen 206, a keep solenoid 255 shown in FIG. 8 is energized to move the switch mirror 222 from the retracted position into the optical path of the scanning unit 200. As a result, as shown in FIG. 9, the optical path between the first and second mirrors 219 and 220 is switched from the glass platen 205 side (dashed line) to the glass platen 206 side (solid line). In this condition, when the lamps 203 and 204 illuminate the document on the glass platen 206, the resulting reflection is reflected by the second and third mirrors 220 and 221 alternately and then routed through the lens 216 to the image sensor 101 to form a reduced image.

As shown in FIG. 8, the switch mirror 222 is supported by a bracket 257 which is in turn supported by an adjust plate 259 in such a manner as to be rotatable about an upper fulcrum 258. The keep solenoid 255 is connected to one end of the bracket 257 remote from the other end which supports the mirror 222. When the keep solenoid 255 is selectively energized or deenergized, the bracket 257 is angularly moved to a position indicated by a solid line in FIG. 8 or to a position indicated by a dashed line. In this way, the switch mirror 222 is movable to the retracted position shown in FIG. 6 or to the advanced position shown in FIG. 9. The retracted position of the switch mirror 222 (dashed line, FIG. 8) is dependent solely on the motion of the keep solenoid 255. However, the advanced position (solid line, FIG. 8) is strictly regulated by a pin 256, i.e., the angular movement of the bracket 257 is restricted by the pin 256.

In the illustrative embodiment, the mirror 222 is capable of adjusting the optical path selected. Specifically, as shown in FIG. 8, the adjust plate 259 is rotatable about a lower fulcrum 262 relative to the body of the scanning unit 200. A spring 260 and an adjust screw 261 respectively abut against opposite sides of the adjust plate 259 between the upper and lower fulcrums 258 and 262, thereby supporting the plate 259 in a substantially vertical position. The spring 260 constantly biases the adjust plate 259 such that the upper fulcrum 258 tends to move to the mirror 222 side. The adjust screw 261 abuts against the other side of the adjust plate 259 at the tip thereof to restrict the rotation of the adjust plate 259 due to the spring 260. When the adjust screw 261 is rotated, the adjust plate 259 is rotated about the lower fulcrum 262 to change the position of the upper fulcrum 258. As a result, the bracket 257 and, therefore, the switch mirror 222 is displaced to adjust the optical path selected.

In the embodiment, the mirrors other than the switch mirror 222 are not provided with the above-described path adjusting function. In the book mode, the optical path is adjusted by adjusting the position of the CCD image sensor 101. With this construction, the embodiment reduces the number of parts of the optics which need adjustment, thereby facilitating the assembly and maintenance of the TPS. Moreover, since the keep solenoid 255 and elements associated therewith are accommodated in the scanning unit 200, they can be replaced or repaired together with the optical elements only if the unit 200 is bodily replaced.

Figure 10:
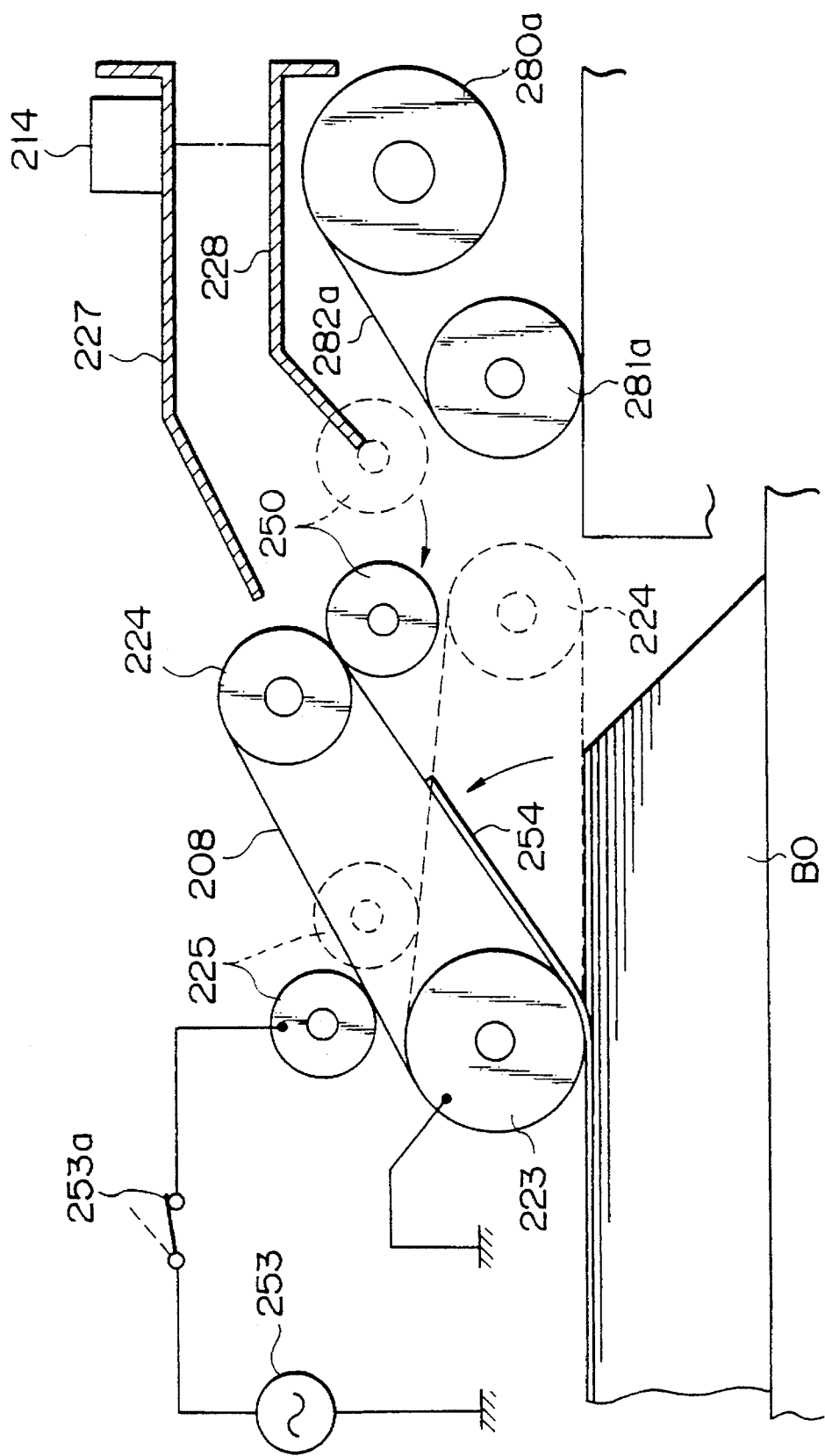
FIG. 10 is a fragmentary section of the scanning unit, demonstrating how the scanning unit lifts the leaf of a book document.

Referring to FIG. 10, the page turning operation of the scanner unit 30, i.e., scanning unit 200 will be described. In the illustrative embodiment, the turn belt 208 is made of PET, PC or PVC by way of example and made up of a surface layer and a back layer. The surface and back layers respectively have a surface resistance of higher than $10^{14}$ $\Omega$ and a surface resistance of lower than $10^8$ $\Omega$. The belt drive roller 223 is constituted by a metallic roller connected to ground and covered with conductive rubber, thereby implementing sure belt drive and grounding. Further, the charge roller 225 is implemented by a metallic roller. An AC power source, or high tension power source, 253 applies a high voltage of $\pm 2$ kV to 4 kV to the charge roller 225 via a switch 253a at a predetermined timing. In this configuration, the switch 253a is turned on at a particular timing, which will be described later, while the scanning unit 200 is in travel and the turn belt 208 is in rotation. Then, the voltage of $\pm 2$ kV to 4 kV from the AC power source 253 is applied to the charge roller 225 with the result that an alternating electric field is generated on the surface of the belt 208. The electric field produces on the surface of the belt 208 a force causing the uppermost leaf 254 of the book BO, which is in contact with the belt 208, to electrostatically adhere to the belt 208.

A pulse generator 253b is connected to the AC power source 253 and capable of changing the frequency thereof under the control of a TPS control board 110. The high tension power source 253 is accommodated in the scanning unit 200. The high voltage harness of the power source 253 is fully received in the scanning unit 200, by contrast to other feed lines and signal lines, thereby insuring safety operation.

Figure 11:
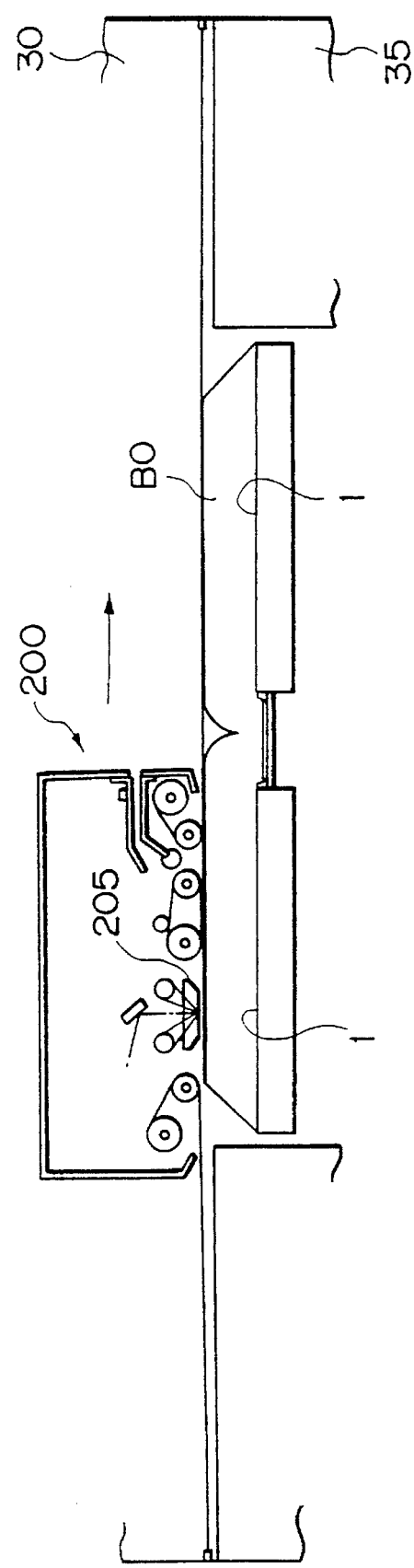
FIGS. 11–16 are views each showing the scanning unit in a particular condition to occur during page turn mode operation of the unit.

When a procedure for reading the book BO begins, the scanning unit 200 located at the end home position, which is defined at the left-hand side of the scanner unit 30, starts moving to the right, as viewed in FIG. 1. At this instant, the turn belt 208 and page feed roller 250 are each moved by a solenoid, not shown, to a position indicated by a broken line in FIG. 10. As shown in FIG. 11, when the reading position of the glass platen 205 of the scanning unit 200 reaches the left page of the book BO, the optics of the unit 200 starts reading the book BO and sequentially reads it from the left page to the right page. The position where the scanning unit 200 starts reading the book BO depends on the size of the book BO; the TPS control board 110 controls it in response to a book size entered on an operation and display control section 111 or detected by size detecting means, not shown. This read start position is different from a read start position (reference edge of the scale 207) defined on the glass platen 206.

Figure 12:
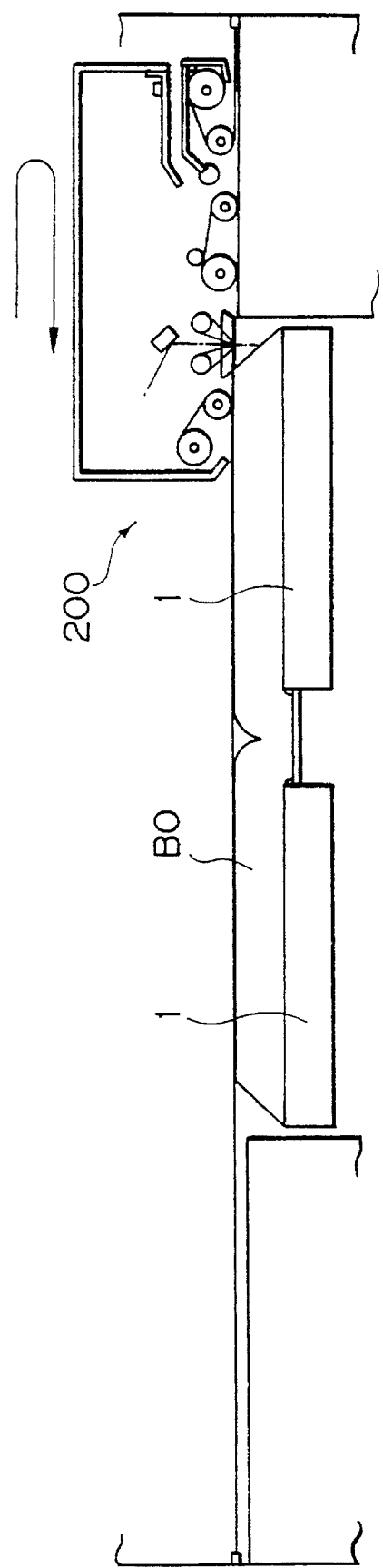

While the optics of the scanning unit 200 sequentially reads the book BO from the left to the right, as shown in FIG. 11, the turn belt 208 and page feed roller 250 are held in the positions indicated by broken lines in FIG. 10. As soon as the scanning unit 200 fully reads the book BO up to the right edge thereof, the moving direction of the unit 200 is reversed, as shown in FIG. 12. At this time, as shown in FIG. 12, the turn belt 208 and page feed roller 250 are each moved to the solid line position shown in FIG. 12. Substantially at the same time, the pulse generator 253b and power source 253 are driven to apply an AC high voltage of predetermined frequency to the charge roller 225, thereby forming a charge pattern on the surface of the turn belt 208.

Figure 13:
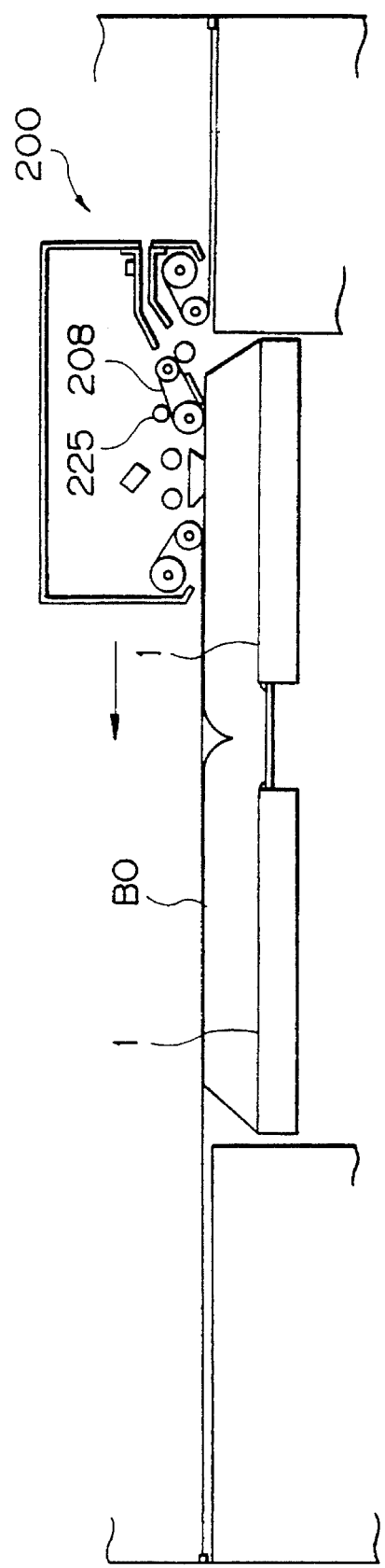

At the beginning of a procedure for turning the page of the book BO, the turn belt 208 and page feed roller 250 are each held in a position indicated by a dashed line in FIG. 10. As a result, the charge pattern formed on the turn belt 208 overlaps the uppermost page 254 of the book BO before the page turning procedure begins. As shown in FIG. 13, when the center of the underside of the turn belt 208 passes by the edge of the uppermost page 254, the belt 208 and roller 250 are brought to the solid line positions shown in FIG. 10. This timing depends on the size of the book BO; the TPS control board 110 also controls it in response to a book size entered on the operation and display control section 111 or detected by the size detecting means. Consequently, only the uppermost leaf 254 of the book BO electrostatically adheres to the surface of the turn belt 208 due to unequal electric fields attributable to the charge pattern.

Figure 17:
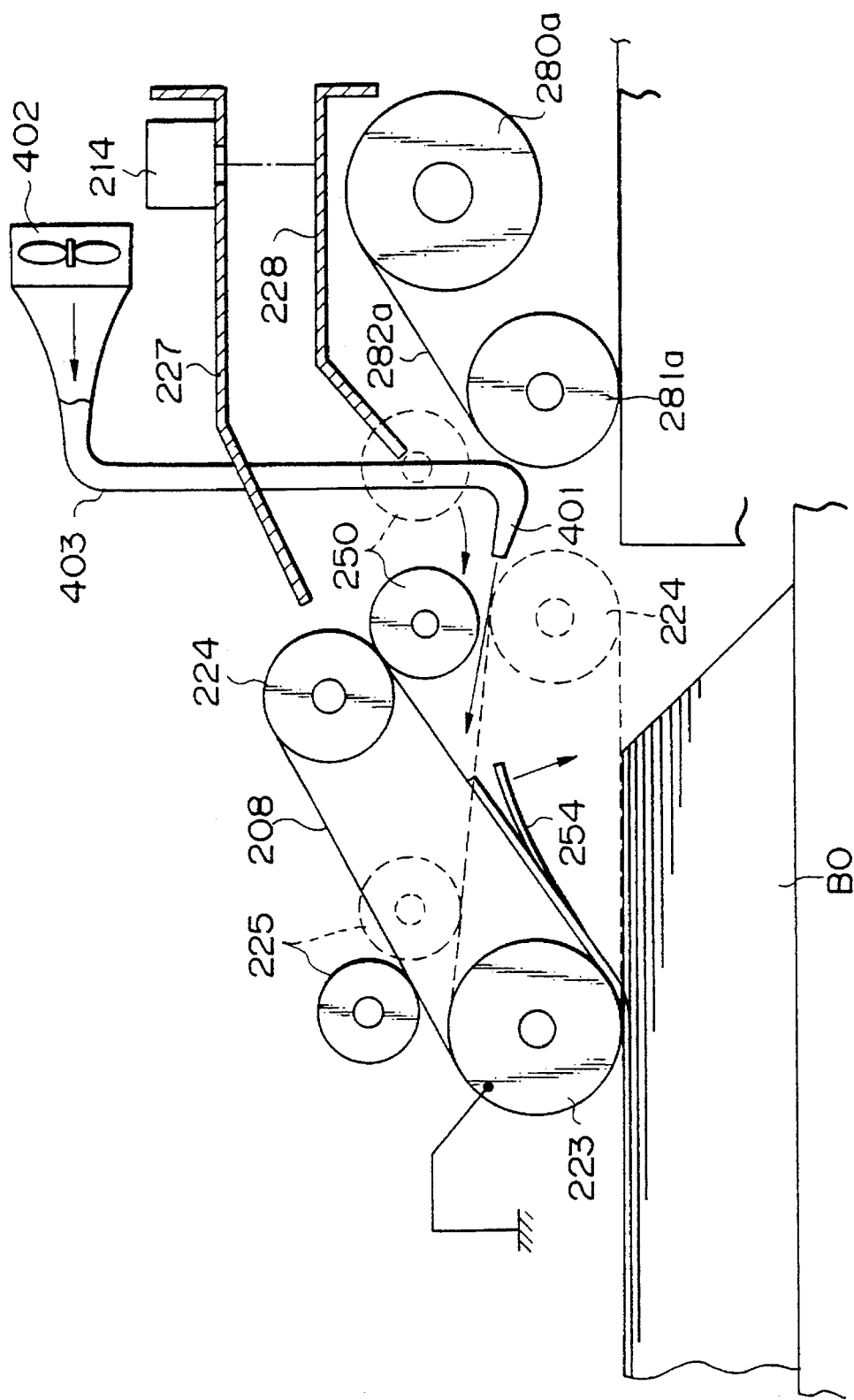
FIG. 17 is a fragmentary section of the scanning unit, showing the page turning operation of the scanning unit.

At this instant, the movement of the scanning unit 200 is suspended for 0.1 second to 3 seconds so as to insure the adhesion of the uppermost page 254 to the turn belt 208. Also, as shown in FIG. 17, a nozzle 401 is oriented toward the center of the flat underside of the turn belt 208. At this step of the page turning operation, a fan 402 blows air against such a portion of the turn belt 208 via a duct 403 and the nozzle 401. As a result, even when the second and successive leaves are accompanied by the first leaf 254, the air from the nozzle 401 separates the former from the latter. This is successful in promoting surer adhesion of only the first leaf 254 to the turn belt 208.

Figure 18:
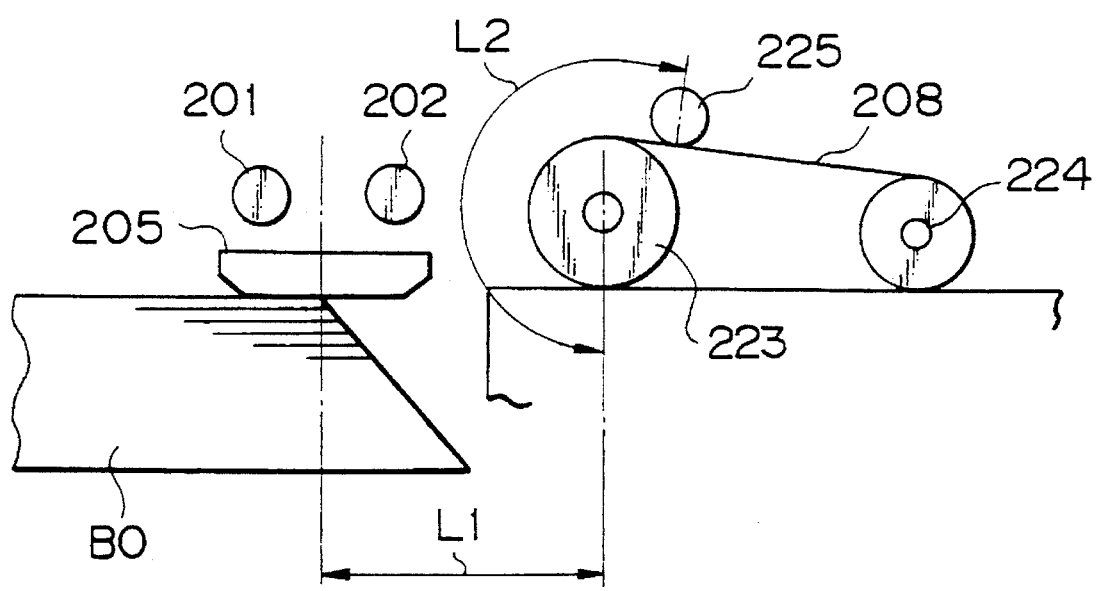
FIG. 18 is a fragmentary view indicative of the reading section of the scanning unit and the timing for charging the turn belt in the page turn mode.

As shown in FIG. 18, the embodiment starts charging the turn belt 208 at the instant when the scanning unit 200 returns after reading the spread pages of the book BO. This frees the scanning unit 200 from wasteful movements and, therefore, enhances efficient operation. The position where the scanning unit 200 starts returning, i.e., the charge start position for the turn belt 208 depends on the size of the book BO; again, the TP control board 110 controls it in response to a book size entered on the operation and display control section 111 or detected by the size detecting means.

If desired, the turn belt 208 may begin to be charged after the scanning unit 200 has started returning. For this purpose, as shown in FIG. 18, the book read position and the lowermost point of the drive roller 223 are spaced apart from each other by a distance L1 which is greater than or equal to a distance L2 between the point where the charge roller 225 contacts the belt 208 and the lowermost point of the roller 223.

When the turn belt 208 and page feed roller 224 are brought to the solid line positions shown in FIG. 10, the voltage for generating the charge pattern is shut off. At the same time, the frequency of the pulse generator 253b is switched to one higher than 500 Hz. As a result, a high frequency AC high voltage is applied to the charge roller 225, thereby dissipating the charge pattern on the belt 208 at high frequency.

Figure 14:
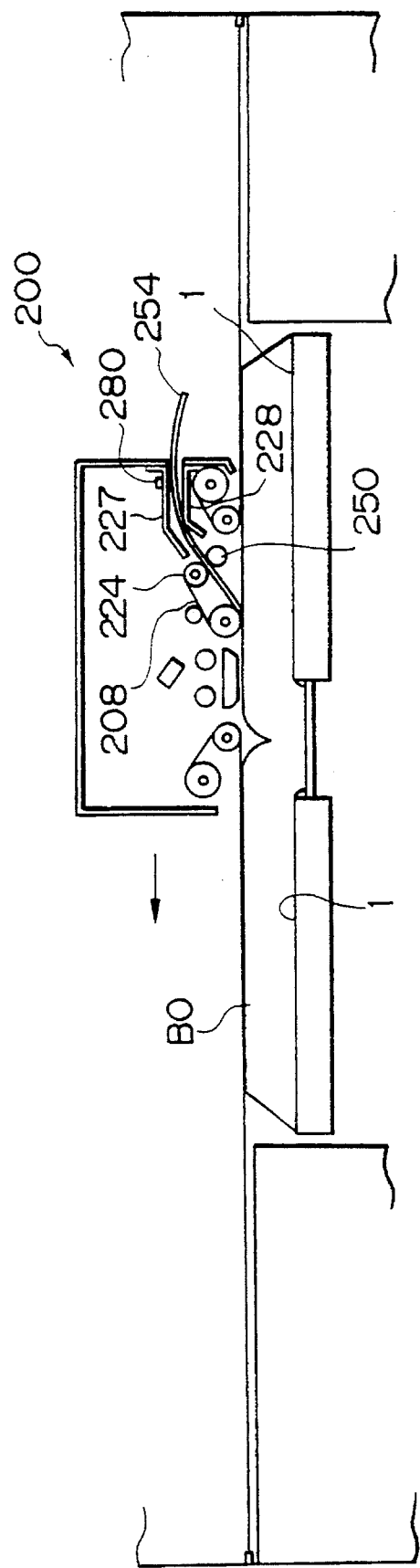

As stated above, after the uppermost leaf 254 of the book BO has been lifted, the scanning unit 200 is brought to a stop for 0.1 second to 3 seconds. Subsequently, the scanning unit 200 is again moved toward the end home position, as shown in FIG. 13. Then, as shown in FIG. 14, the leaf 254 is surely conveyed by being nipped by the turn roller 224 and page feed roller 250. The edge of the leaf 254 is sequentially driven out to the right of the scanning unit 200 via an upper and a lower leaf guide 227 and 228, FIG. 3. The leaf guides 227 and 228 are located at the right portion of the scanning unit 200. At this instant, the turn sensor 214, FIG. 3, mounted on the upper leaf guide 227 senses the leaf 254 driven out of the scanning unit 200 through leaf exit 215 (FIG. 3). The resulting output of the sensor 214 indicates that the page 254 has been correctly turned over.

It will be seen that the scanning unit 200 having turned over the page 254 does not roll or bend it and, therefore, does not damage it. In addition, since it is not necessary to provide the scanning unit 200 with means for accommodating the leaf being turned over, the scanning unit 200 is small size.

Figure 15:
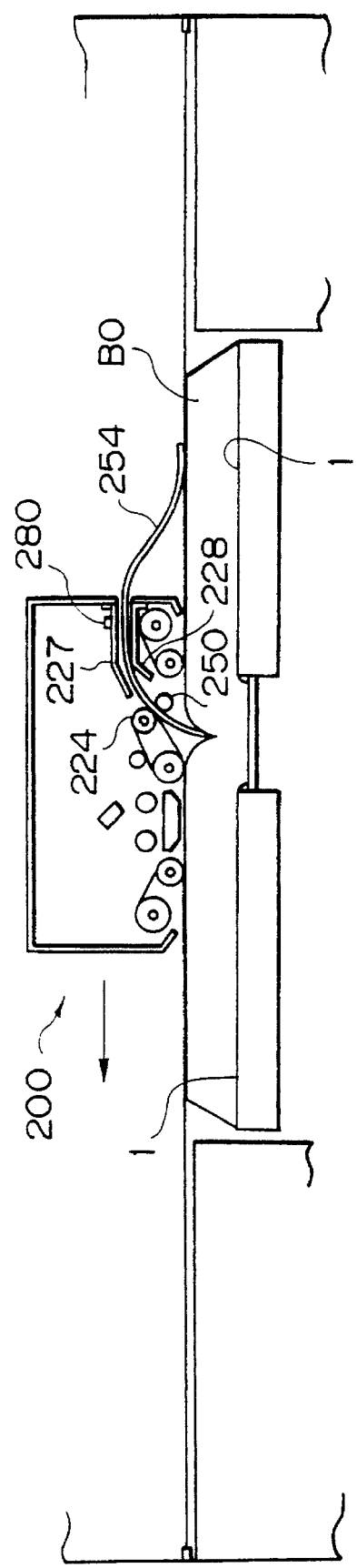

As shown in FIG. 15, when the scanning unit 200 has lifted the leaf 254 up to the bound portion BOa of the book BO, the turn belt 208 and page feed roller 250 are restored to their original positions ( dashed lines, FIG. 10). In this condition, as the scanning unit 200 is further moved toward the end home position, the bound portion BOa of the book BO pulls the leaf 254. As a result, the leaf 254 is sequentially returned to the outside of the scanning unit 200 via the leaf guides 227 and 228 and laid on the left page of the book BO, as shown in FIG. 17.

When the leaf 254 is entirely laid on the left page of the book BO, a single document reading and page turning cycle of the scanning unit 200 ends. Assume that such a reading and paging turning cycle should be repeated, or that only the reading movement or the page turning movement should be repeated. Then, the moving direction of the scanning unit 200 is reversed at the same time as the leaf 254 is entirely laid on the left page of the book BO. This allows the scanning unit 200 to move in a reciprocating motion over the shortest course.

It is to be noted that the scanning unit 200 may read the book BO without turning the page or turn the page without reading it.

Figure 19:
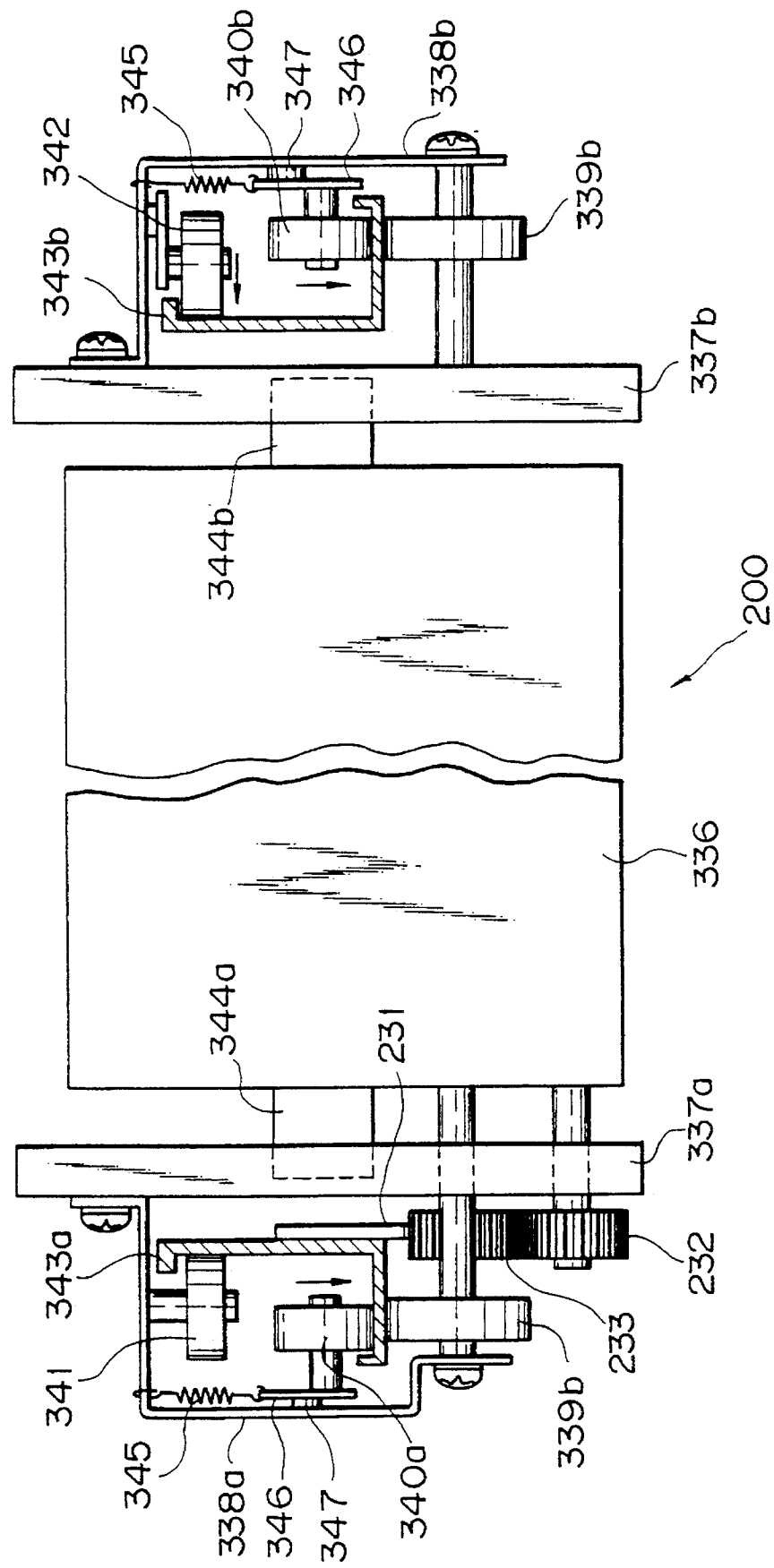
FIG. 19 is a side elevation showing a structure in which the scanner unit supports the scanning unit.

A rail arrangement for guiding the scanning unit 200 will be described hereinafter. As shown in FIG. 19, the scanning unit 200 includes an optics unit 336 accommodating the previously stated optics. The optics unit 336 is rotatably supported by a pair of side plates 337a and 337b, which are respectively positioned at the front and the rear of the scanner unit 30, via two front support rods 344a and one rear support rod 344b. In this configuration, the optics unit 336 follows only the front side plate 337a, but it does not follow the relative torsion of the side plates 337a and 337b.

Two parallel rails 343a and 343b are respectively affixed to the front and rear side plates 337a and 337b at the right and left ends thereof. The rails 343a and 343b each has a generally L-shaped cross-section. Roller brackets 228a and 338b are respectively affixed to the side plates 337a and 337b in such a manner as to surround the rails 343a and 343b. Rollers 339a and 340a are rotatably mounted on the inner periphery of the bracket 338a and hold a horizontal portion included in the rail 343a therebetween. Likewise, rollers 339b and 340b are mounted on the bracket 338b and hold a horizontal portion included in the rail 343b therebetween. The rollers 339a and 339b position the scanning unit 200 in the up-and-down direction during book reading and page turning. The side plates 337a and 337b are each provided with two such rollers 339a or 339b.

Figure 20:
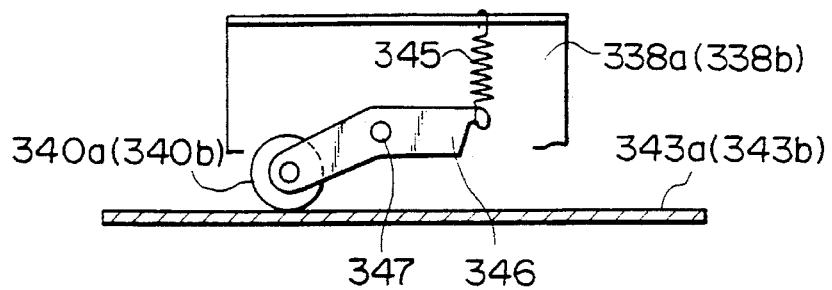
FIG. 20 is a side elevation showing a relation between rails and rollers included in a mechanism for supporting the scanning unit on the scanner unit.

The rollers 340a and 340b respectively press the horizontal portions of the rails 343a and 343b from above. Specifically, as shown in FIG. 20, the rollers 340a and 340b are each rotatably supported by the free end of a respective bracket 346 which resembles a bell crank in shape. The bracket 346 is rotatably supported by a stud 347 provided on the bracket 338a or 338b at the intermediate portion thereof. A tension spring 345 is anchored to the base end of the bracket 346 and the associated bracket 338a or 338b. Hence, the roller 340a or 340b is constantly biased to press the horizontal portion of the rail 343a or 343b from above. The pressures exerted by the rollers 340a and 340b on the rails 343a and 343b, respectively, provide the scanning unit 200 with a tendency to move upward in the scanner unit 30. As a result, the rollers 339a and 339b respectively abut against the lower surfaces of the horizontal portions of the rails 343a and 343b, thereby positioning the scanning unit 200 relative to the scanner unit 30. To position the scanning unit 200 in the depthwise direction, there are provided rollers 341 and 342. The roller 341 is rotatably mounted on the front bracket 338a. The roller 342 presses the rear bracket 338b inward with the same structure as the rollers 340a and 340b. The rollers 341 and 342 are so arranged as to press horizontal portions included in the rails 343a and 343b toward each other.

Figure 21:
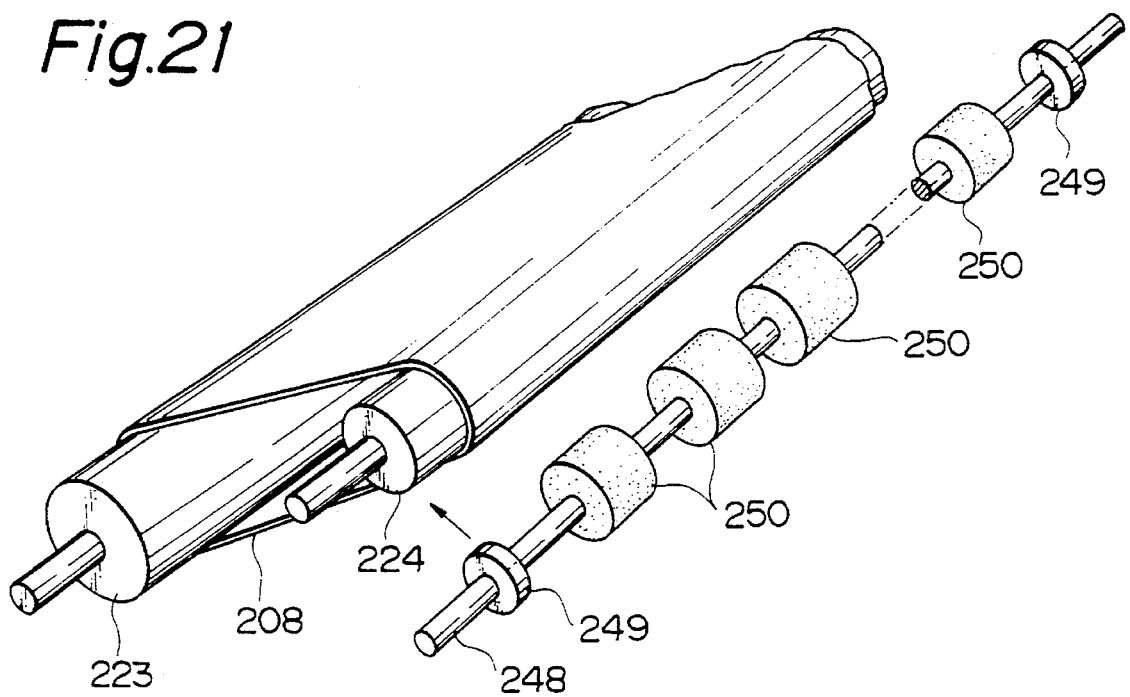
FIG. 21 is a perspective view showing a positional relation between the turn belt and a page feed roller disposed in the scanning unit.
Figure 22:
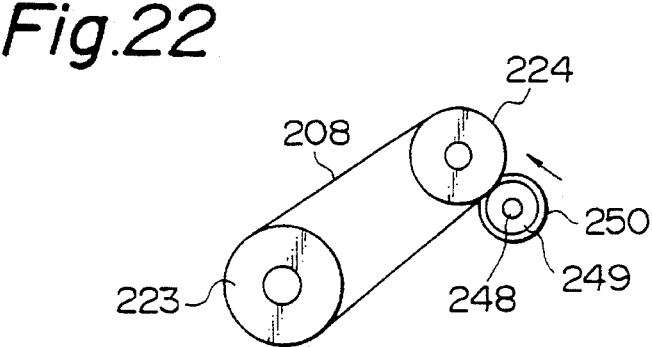
FIG. 22 is a side elevation showing the page feed roller contacting the turn belt.

The page feed roller 250 is constructed and arranged as will be described with reference to FIGS. 21–24. As shown in FIGS. 21 and 22, the roller 250 has a shaft 248 and a plurality of roller elements mounted on the shaft at predetermined intervals over the width of the turn belt 208. The roller elements 250 are made of foam polyurethane or similar soft resin, rubber, or similar elastic material. As shown in FIG. 21, the turn roller 224 has a greater width than the turn belt 208 and protrude from the belt 208 at opposite ends thereof. Drive rollers 249 are mounted on the shaft 248, and each has a diameter slightly smaller than the diameter of the roller elements 250. The drive rollers 249 respectively face the opposite ends of the turn roller 224 and are made of, for example, rubber harder than the roller elements 250.

The lower page guide 228, FIG. 10, has a comb-like edge thereof adjoining the page feed roller 250. When the page feed roller 250 is held at the retracted position (dashed line, FIG. 10), the roller elements thereof are respectively received in the recesses of the comb-like edge of the guide 228, i.e., the former is aligned with the latter when seen in a side elevation. When the turn belt 208 is elevated to the position indicated by a solid line in FIG. 10, the roller 250 is also brought to the position indicated by a solid line. In this position, the drive rollers 249 mounted on the shaft 248 abut against opposite ends of the turn roller 224, so that a part of the periphery of the roller 250 is slightly pressed by the turn belt 208. As a result, as shown in FIG. 22, the roller elements of the roller 250 are deformed due to the difference between their diameter and the diameter of the drive rollers 249. In this condition, a force for conveying the leaf lifted by the turn belt 208 is applied to the roller elements 250. Also, the rotation of the turn roller 224 is transferred to the roller elements 250 via the drive rollers 249 which contact the roller 224. At this instant, while the drive rollers 249 rotate at the same peripheral speed as the turn roller 224, the roller elements 250 rotate at a higher peripheral speed than the roller 224 since their diameter is greater than the diameter of the drive rollers 249. Therefore, the linear velocity of the rollers 250 is equal to or higher than the linear velocity of the turn belt 208, insuring the conveyance of the leaf lifted by the belt 208.

Figure 16:
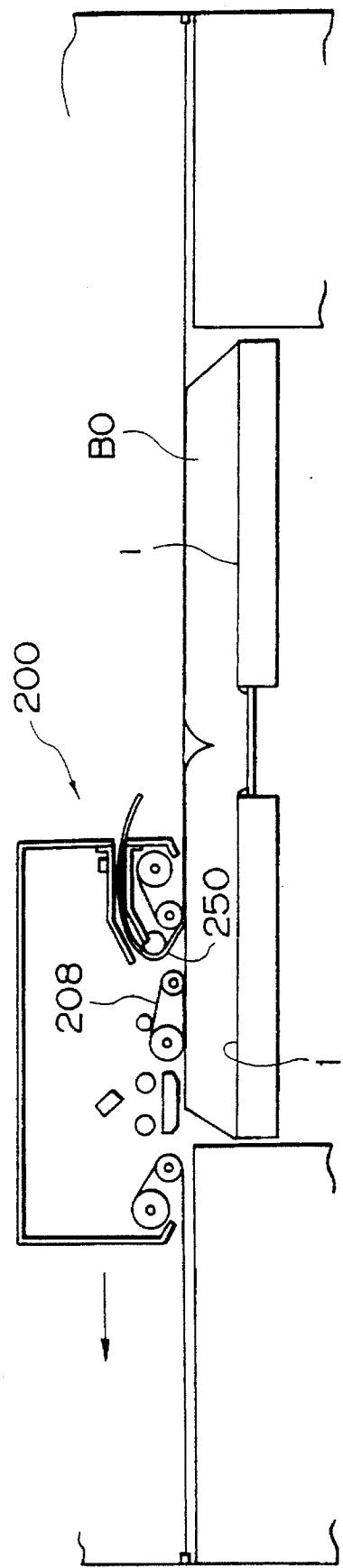

On the other hand, when the leaf lifted by the turn belt 208 is to be released from the scanning unit 200, as shown in FIG. 16, the page feed roller 250 and turn belt 208 are retracted to their positions indicated by dashed lines in FIG. 10.

Figure 23:
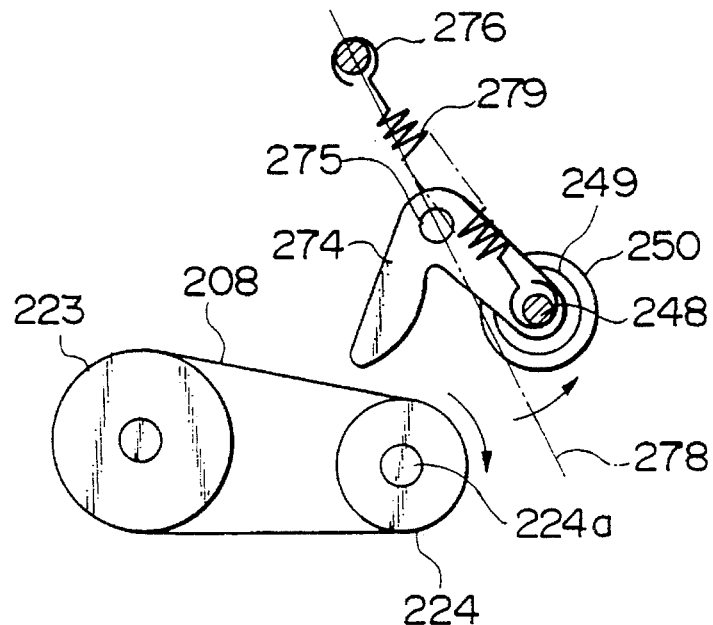
FIG. 23 is a side elevation showing the page feed roller retracted from the turn belt by a toggle joint device in association with the movement of the turn belt.
Figure 24:
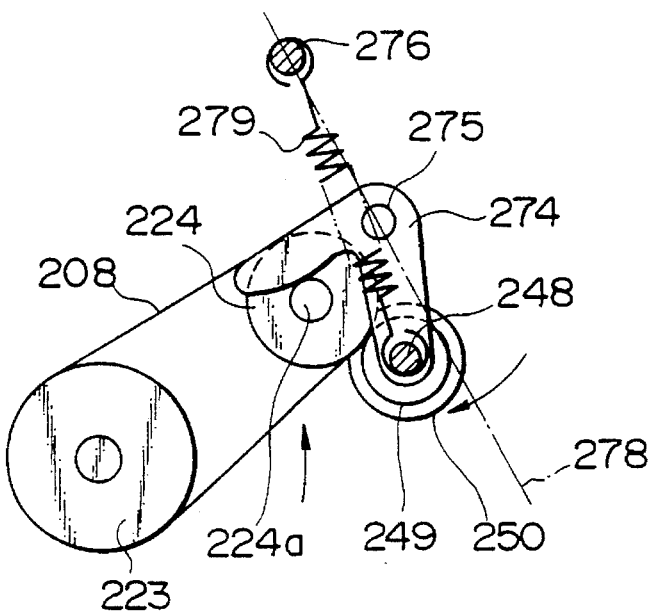
FIG. 24 is a side elevation showing the page feed roller brought into contact with the turn belt by the toggle joint.

FIGS. 23 and 24 show a toggle joint device for controlling the above-described motion of the leaf feed roller 250. As shown, the shaft 248 of the roller 250 is rotatably supported by one end of a toggle lever 274 which resembles a bell crank. The toggle lever 274 is journalled to the body of the scanning unit 200 via a fulcrum 275. A pin 276 is studded on the body of the scanning unit 200. A tension spring 279 is anchored to the pin 276 and shaft 248 at opposite ends thereof. This implements a toggle mechanism having an imaginary neutral line 278 extending through the pin 276 and fulcrum 275.

As shown in FIG. 23, the toggle mechanism usually maintains the turn belt 208 and page feed roller 250 in the dashed line positions, i.e., retracted positions shown in FIG. 10. As the turn roller 224 starts rising toward the solid line position of FIG. 10, the shaft 224a of the turn roller 224 abuts against the other end of the toggle lever 274. As a result, the turn roller 224 further rises while rotating the toggle lever 274 about the fulcrum 275. Before the shaft 248 moves over the neutral line 278, the page feed roller 250 tends to return to the original position due to the action of the tension spring 279. However, once the shaft 248 moves away from the neutral line 278, the force of the spring 279 acts in such a direction that the page feed roller 250 abuts against the turn roller 224. As a result, when the turn roller 224 has fully risen to the dashed line position of FIG. 10, the drive rollers 249 abut against opposite ends of the turn roller 24 due to the action of the spring 279. In this condition, a part of the periphery of the page feed roller 250 is slightly pressed by the turn belt 208.

On the other hand, when the leaf lifted by the turn belt 208 is to be released from the scanning unit 200, as shown in FIG. 16, the turn roller 224 is lowered toward the dashed line position of FIG. 10 while urging the drive rollers 249 away from the position shown in FIG. 24. When the shaft 248 moves over the neutral line 278, the force of the spring 279 acts in such a direction that the paper feed roller 250 retracts to the dashed line position of FIG. 10. Consequently, the roller 250 is retracted to the position shown in FIG. 23, and the turn roller 224 is restored to the original position.

As stated above, the page feed roller 250 is interlocked with the turn belt 208 such that the former moves into contact with the latter due to the elevation of the latter. This reduces the cost and size of the mechanism for driving the page feed roller 250. Further, the roller 250 starts moving on the elapse of a predetermined period of time after the start of elevation of the belt 208 (during the latter half of the elevation of the belt 208). Hence, even when the edge of the leaf lifted by the belt 208 is protruded from the belt 208, it can be surely nipped by the belt 208 and roller 250. This provides the scanning unit 200 with an increased margin in respect of page turning operation.

Figure 25:
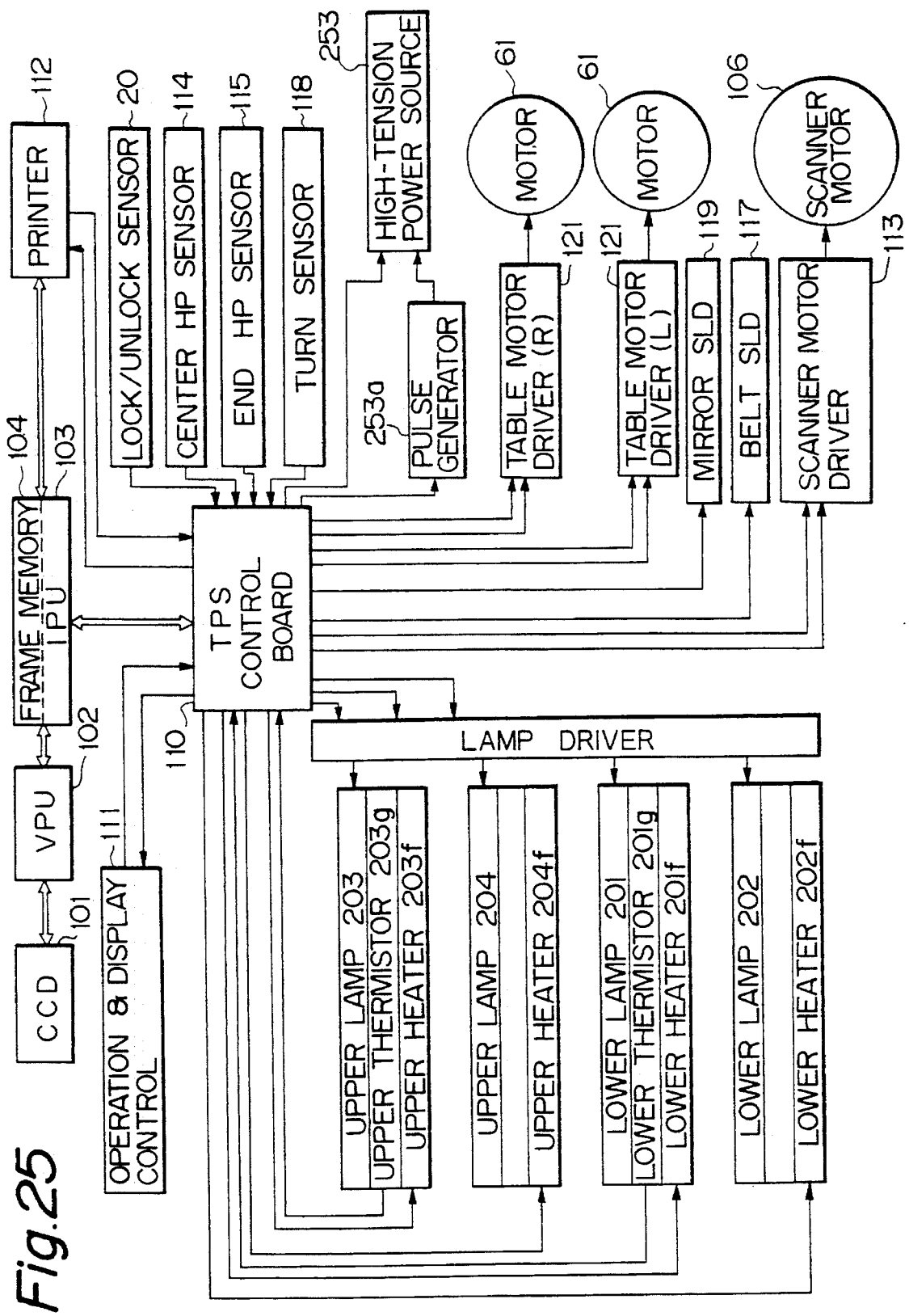
FIG. 25 is a block diagram schematically showing drive control means included in the device of FIG. 1.

Referring to FIG. 25, an electrical arrangement built in the TPS will be described. As shown, the TPS has the TPS control board 110 which controls the entire TPS and has a one-chip CPU, an external ROM, a RAM, I/O ports, a timer, and a serial interface. The TPS control board 110 is connected to the operation and display control section 111 and a printer section 112 by the serial interface so as to interchange commands and data therewith. A scanning unit driver 113 reversibly drives the scanner motor 106 and, therefore, the scanning unit 200. A center HP (Home Position) sensor 114 and an edge HP sensor 115 each senses the home position of the scanning unit 200 before the scanning unit 200 starts scanning a document. In a book mode, the position sensed by the center HP sensor 114 is the position where the scanning unit 200 starts moving. As shown in FIG. 1, the turn belt 208 is disposed in the scanning unit 200 for turning the pages of the book BO by electrostatic adhesion. When a charge pattern is formed on the belt 208 by the high-tension power source 116, the page or leaf of the book BO electrostatically adheres to the belt 208. A belt up-down solenoid 117 causes the turn belt 208 carrying the page of the book BO therewith to rise and lift the edge of the page toward the scanning unit 200. At this instant, a turn sensor 118 determines whether or not the page has been turned over. When the turn sensor 118 does not sense the turn-over of the page at a predetermined time, the page turning movement is effected again.

A mirror switching solenoid 119 selects either of a lower optical path for reading the book BO and an upper optical path for reading a sheet document or similar ordinary document. Implemented by a keep solenoid, the solenoid 119 is energized only when the optical path should be switched. The lower fluorescent lamps 201 and 202 and upper fluorescent lamps 203 and 204 are used as light sources. Light sensors 201a, 202a, 203a and 204a are respectively associated with the lamps 201, 202, 203 and 204, and each senses the quantity of light from the associated lamp. The outputs of the light sensors 201a–204a are fed back to the TPS control board 110 via a lamp driver, thereby maintaining the output light constant. Heaters 201f, 202f, 203f and 204f and thermistors 201g, 202g, 203g and 204g are respectively mounted on the lamps 201, 202, 203 and 204 in order to control the temperature of the lamps. Although four lamps are connected to the lamp driver 120, a device for turning on the lamps is implemented by only two circuits. The lamp driver 120 is provided with a circuit for switching the connection of the upper and lower lamps in response to a control signal from the TPS control board 110.

When the lamps 201 and 202 or the lamps 203 and 204 illuminate a document, an imagewise reflection is routed through mirrors and a lens to the CCD image sensor 101 which is connected to the VPU 102, as will be described in detail later. The VPU 102 generates a clock for driving the image sensor 101, converts an analog image signal output from the image sensor 101 to a digital value with an ADC, and sends the digital value to the printer 112 via the frame memory 104 and IPU 103. At this instant, the frame memory 104 is used to arbitrate the read linear speed of the TPS and the process linear speed of the printer section 112. The IPU 103 processes input image data.

In summary, it will be seen that the present invention provides a book document reading device capable of surely causing only the uppermost leaf of a book document to adhere to a turn belt and, therefore, turning the pages of the document stably since a scanning unit thereof is brought to a stop when the turn belt starts turning the page of the document.

Various modifications will become possible for those skilled in the art after receiving the teachings of the present disclosure without departing from the scope thereof.

What is claimed is:

1. A device for reading a book document, comprising:

a document table for setting the book document in a spread position face up;

page turning means for turning a page of the book document; and a scanning unit supporting said page turning means for scanning the book document;

said page turning means comprising:

a belt made of a dielectric material;

support means over which said belt is passed such that said belt has a flat portion at an underside thereof;

drive means for rotating said belt in a direction in which said scanning unit moves;

electric field generating means for generating an electric field on said belt for electrostatically attracting an uppermost leaf of the book document and separating said uppermost leaf from other leaves; and moving means for moving said support means between a first position where said flat portion of said belt contacts the uppermost leaf of the book document for attracting said uppermost leaf, and a second position where said flat portion is spaced apart from said book document while carrying said uppermost leaf therewith to thereby separate said uppermost leaf from other leaves;

the device further including at least one page feed roller which contacts said belt to form a nip between said belt and said page feed roller when said support means is in said second position, and wherein a leaf of said book document is fed into said nip between said belt and said page feed roller.

2. A device as claimed in claim 1, wherein when said support means moves from said first position to said second position, said scanning unit is caused to stop moving.

3. A device for reading a book document, comprising:

a document table for setting the book document in a spread position face up;

page turning means for turning a page of the book document; and a scanning unit supporting said page turning means for scanning the book document;

said page turning means comprising:

a belt made of a dielectric material;

support means over which said belt is passed such that said belt has a flat portion at an underside thereof;

drive means for rotating said belt in a direction in which said scanning unit moves;

electric field generating means for generating an electric field on said belt for electrostatically attracting an uppermost leaf of the book document and separating said uppermost leaf from other leaves; and moving means for moving said support means between a first position where said flat portion of said belt contacts the uppermost leaf of the book document for attracting said uppermost leaf, and a second position where said flat portion is spaced apart from said book document while carrying said uppermost leaf therewith to thereby separate said uppermost leaf from other leaves;

wherein said page turning means further comprises air blowing means for blowing air against said flat portion of said belt while said flat portion of said belt is holding a leaf of said book document.

4. A device as claimed in claim 3, wherein when said support means moves from said first position to said second position, air is blown against said flat portion of said belt by said air blowing means.

5. A device as claimed in claim 1, wherein said support means is held in said second position while said scanning unit moves in a direction opposite to a page turning direction.

6. A device for reading a book document, comprising:

a document table for setting the book document in a spread position face up;

page turning means for turning a page of the book document; and a scanning unit supporting said page turning means for scanning the book document;

said page turning means comprising:

a belt made of a dielectric material;

support means over which said belt is passed such that said belt has a flat portion at an underside thereof;

drive means for rotating said belt in a direction in which said scanning unit moves;

electric field generating means for generating an electric field on said belt for electrostatically attracting an uppermost leaf of the book document and separating said uppermost leaf from other leaves; and moving means for moving said support means relative to a remainder of said scanning unit between a first position where said flat portion of said belt contacts the uppermost leaf of the book document for attracting said uppermost leaf, and a second position where said flat portion is spaced apart from said book document while carrying said uppermost leaf therewith to thereby separate said uppermost leaf from other leaves, and wherein said moving means moves at least a portion of said flat portion of said belt in a direction away from said other leaves during movement from said first position to said second position;

wherein said moving means moves said support means such that when said scanning unit is moved in a page turning direction, said support means is moved to said second position while carrying the uppermost leaf therewith, and said scanning unit is moved in said page turning direction with said support means held in said second position, and then said support means is moved to said first position when said belt is past a bound portion of the book document.

7. A device as claimed in claim 1, wherein a high voltage generating device for applying a high voltage to said electric field generating means is disposed in said scanning unit.

8. A device as claimed in claim 1, further comprising:

size data processing means for entering or detecting a size of the book document and storing said size;

a high voltage generating device for applying a high voltage to said electric field generating means; and control means for controlling a timing for setting up or interrupting application of the high voltage to said electric field generating means, depending on the size of the book document.

9. The device of claim 1, wherein said electric field generating means includes a charge roller which contacts said belt to provide a charge on said belt, said electric field generating means further including a power source and pulse generator connected to said charge roller.

10. The device of claim 1, wherein said scanning unit includes a platen through which said book document is scanned, and wherein said scanning unit is moved in a first direction during a page turning operation, and said belt trails said platen with respect to said first direction during a page turning operation.

11. The device of claim 1, further including a leaf guide located adjacent a downstream side of said belt with respect to an initial feeding direction of said belt during a page turning operation such that a leaf of said book document is guided by said leaf guide after being fed between said belt and said page feed roller, and wherein a turn sensor is disposed along said leaf guide for sensing a leaf passing into said leaf guide.

12. The device of claim 11, wherein said leaf guide includes and exit end at which a leaf exits said scanning unit after passing said leaf guide and turn sensor.

13. The device of claim 1, wherein said at least one page feed roller is mounted upon a toggle lever, and wherein said support means includes a support roller mounted upon a shaft, and further wherein said shaft contacts and moves said toggle lever during movement of said support means from said first position to said second position, thereby moving said at least one page feed roller into contact with said belt.

14. A device for reading a book document comprising:

a document table for supporting a book document;

a scanning unit for scanning said book document, said scanning unit including a platen through which said book document is optically scanned;

a page turning belt mounted upon said scanning unit for attracting and feeding a leaf of said book document during a page turning operation; and means for moving said scanning unit during a page turning operation;

wherein said page turning belt is mounted on a trailing side of said scanning unit relative to said platen with respect to movement of said scanning unit during a page turning operation, such that a leaf of said book document is attracted to said page turning belt at a trailing side of said scanning unit relative to said platen during a page turning operation.

15. The device of claim 14, further including a belt drive roller and a belt support roller disposed inside of said page turning belt, and means for moving said belt support roller between a first position at which said page turning belt extends substantially horizontally between said drive roller and said support roller, and a second position at which said page turning belt is inclined between said drive roller and said belt support roller.

16. The device of claim 15, further including air blowing means for blowing air against a lower flat portion of said page turning belt when said support roller is in said second position.

17. The device of claim 15, further including at least one page feed roller which contacts said page turning belt when said support roller is in said second position.

18. The device of claim 14, further including a charge roller which contacts said page turning belt to form a charge on said page turning belt, and wherein a power source and pulse generator are connected to said charge roller.

19. The device of claim 14, wherein said scanning unit includes a leaf exit through which a portion of a leaf exits said scanning unit during a page turning operation.

20. The device of claim 19, further including a pair of leaf guides disposed between said page turning belt and said leaf exit, said pair of leaf guides guiding a leaf from said page turning belt to said leaf exit during a page turning operation.

21. The device of claim 20, further including a turn sensor disposed along said pair of leaf guides for sensing a leaf being driven out of said scanning unit during a page turning operation.

22. The device of claim 15, further including at least one page feed roller, and means for moving said page feed roller into contact with said page turning belt when said belt support roller is in said second position and out of contact with said page turning belt when said belt support roller is in said first position.

23. The device of claim 22, wherein said means for moving said page feed roller includes a toggle lever, and wherein a shaft of said belt support roller contacts and pivots said toggle lever during movement from said first position to said second position, and wherein said page feed roller is mounted on said toggle lever.

24. The device of claim 14, further including at least one page feed roller and means for moving said page feed roller into and out of contact with said page turning belt.

* * * * *